(12) United States Patent
Springer et al.

(10) Patent No.: US 6,191,727 B1
(45) Date of Patent: Feb. 20, 2001

(54) SYSTEM AND METHOD FOR DETECTING SIGNALS ACROSS RADAR AND COMMUNICATIONS BANDS

(75) Inventors: Joseph F. Springer, Southampton; Conrad H. Haber, Turnersville, both of NJ (US)

(73) Assignee: L-3 Communications Corporation, New York, NY (US)

( * ) Notice: Under 35 U.S.C. 154(b), the term of this patent shall be extended for 0 days.

(21) Appl. No.: 09/456,726

(22) Filed: Dec. 8, 1999

Related U.S. Application Data (60) Provisional application No. 60/111,558, filed on Dec. 9, 1998, and provisional application No. 60/111,560, filed on Dec. 9, 1998.

(51) Int. Cl.[7] .................................................. G01S 7/292
(52) U.S. Cl. ............................ 342/195; 342/196; 342/13
(58) Field of Search ............................... 342/13, 195, 196

(56) References Cited

U.S. PATENT DOCUMENTS

| | | | |
|---|---|---|---|
| 3,665,512 | * 5/1972 | Hall et al. | 342/13 |
| 3,876,946 | 4/1975 | LaClair et al. | 325/363 |
| 4,166,980 | 9/1979 | Apostolos et al. | 325/363 |
| 4,209,835 | * 6/1980 | Guadagnolo | 364/715 |
| 4,559,602 | * 12/1985 | Bates, Jr. | 364/487 |
| 5,063,386 | 11/1991 | Bourdeau et al. | 342/40 |
| 5,092,343 | * 3/1992 | Spitzer et al. | 128/733 |
| 5,381,150 | * 1/1995 | Hawkins et al. | 342/13 |
| 5,583,505 | * 12/1996 | Andersen et al. | 342/13 |

FOREIGN PATENT DOCUMENTS

| | | | |
|---|---|---|---|
| 948172-A2 | * 10/1999 | (EP) | H04L/27/00 |
| 221547 | 9/1989 | (GB) . | |

* cited by examiner

*Primary Examiner*—John B. Sotomayor
(74) *Attorney, Agent, or Firm*—Woodcock Washburn Kurtz Mackiewicz & Norris LLP (57) ABSTRACT

Apparatus and methods for processing RF signals are disclosed. A method according to the invention includes receiving a set of time domain energy samples representing signal energy present in an RF spectrum, transforming the set of time domain energy samples into a set of frequency domain power samples, determining from the set of frequency domain power samples whether a signal of interest is present in the RF spectrum, and forwarding to a follow on system a subset of the set of frequency domain power samples, wherein the subset corresponds to the signal of interest. Transforming the time domain samples can include dividing the set of time domain energy samples into a plurality of N windows, each of which is associated with a predefined window period, and performing an FFT on each said window to generate a set of K frequency bins, wherein each frequency bin has a value based on energy present in a predefined frequency band during the corresponding window period. Determining whether the signal is present can include generating an energy map that represents energy present in the RF spectrum as a function of frequency and time. The energy map can be a bitmap having N×K frequency cells, wherein each frequency cell has a binary value based on the value of a corresponding frequency bin. The binary value can be based on whether the value of the corresponding frequency bin exceeds a predefined threshold.

21 Claims, 8 Drawing Sheets

SYSTEM AND METHOD FOR DETECTING SIGNALS ACROSS RADAR AND COMMUNICATIONS BANDS

RELATED APPLICATIONS

This application claims priority from U. S. Provisional Patent Application Serial No. 60/111,558, filed Dec. 9, 1998, the contents of which are hereby incorporated by reference. This application claims priority from U. S. Provisional Patent Application Serial No. 60/111,560, filed Dec. 9, 1998, the contents of which are hereby incorporated by reference. The subject matter disclosed herein is related to the subject matter disclosed in application Ser. No. 09/456,584, filed on even date herewith, entitled "System and Method for Limiting Histograms."

FIELD OF THE INVENTION

The present invention relates in general to radio frequency (RF) energy analysis systems and methods. More particularly, the present invention analyzes wideband RF in realtime to extract potential signals of interest while removing noise. The present invention performs the extraction and analysis function in all bands, Hf to microwave, for radar and communications signals.

BACKGROUND OF THE INVENTION

Typical signal collection and processing systems detect the presence of signals of interest in an RF environment by determining whether signal power within a certain frequency range exceeds a predefined threshold level for a sufficient duration of time. "Channelized" systems, for example, tune a receiver having a known bandwidth to a certain frequency and collect all the RF energy present in the environment in that frequency range. These systems determine whether the signal power exceeds the predefined threshold and, if so, conclude that a pulse exists in that range. The channelizers then define a pulse start time as the time at which the signal energy first exceeded threshold, and a pulse end time as the time that signal energy falls below threshold. A known deficiency of such channelized systems is that they require significant resources to monitor a large number of frequency bands. Another deficiency of these systems is that each channelizer is tuned to a fixed bandwidth that may or may not be consistent with the bandwidths of the signals of interest. Consequently, these systems do not provide optimal sensitivity.

"Compressive receivers" continually sweep a broad bandwidth with a narrowband filter. These systems can detect narrowband pulses in a broadband environment, but suffer from an inability to detect the presence of signal energy that is present in the environment during periods in which the narrowband filter is not tuned to the frequency band in which that signal energy is present. Additionally, the bandwidth of the narrowband filter is tuned to a fixed bandwidth that may or may not be consistent with the bandwidths of the signals of interest. Consequently, these systems do not provide optimal sensitivity, do not necessarily capture the signal of interest, and are analog systems.

Instantaneous Frequency Measurement (IFM) receivers minimize the sweep time limitations of the compressive receiver by providing a broadband frequency discriminator that rapidly responds to a signal's presence. The IFM receiver, however, is unable to provide accurate frequency measurements in the presence of multiple simultaneous input pulses, as are typically encountered in crowded RF environments.

Broadband signal processing systems are often required to detect the presence of narrowband signal energy in a wideband RF environment that includes, for example, radar pulses and/or communications pulses. It is desirable that such systems are able to detect all that RF energy that is present in a wide frequency range for a certain period of time. It is also desirable to minimize the resources required to detect these signals. Designers of such signal processing systems, therefore, would benefit from methods and apparatus that analyze wideband radio frequency spectra that include both radar and communications signals to extract potential signals of interest while removing noise and other unwanted RF energy.

SUMMARY OF THE INVENTION

The present invention satisfies these needs in the art by providing apparatus and methods for processing RF signals. The inventive method comprises generating an energy map of collected radio frequency (RF) energy as a function of time and frequency for a predefined dwell period and dwell bandwidth. The collected RF energy can include energy from communications signals as well as radar signals, transient signals as well as continuous signals. From the energy map, it can be determined whether a pulse is present in the RF spectrum. If a pulse is present in the RF spectrum, then a pulse bandwidth and pulse duration can be determined from the energy map.

The energy map can be generated by dividing the dwell period into a set of k time windows and dividing the dwell bandwidth into a set of n frequency bins. An energy grid comprising n×k frequency-time cells can then be generated. Each frequency-time cell corresponds to one of the frequency bins and to one of the time windows and has a value based on the collected RF energy present in the corresponding frequency bin during the corresponding time window. A binary value can be assigned to each of the frequency-time cells based on whether the collected RF energy present in the corresponding frequency bin during the corresponding time window exceeds a predefined energy presence threshold. If noise is present in the RF spectrum, the noise can be filtered from the energy map.

If a pulse is present in the RF spectrum, a tag can be generated for the pulse that includes a pulse characterization parameter that characterizes the pulse. The pulse characterization parameter can be based, for example, on pulse width, center frequency, angle of arrival, or time of arrival.

A method according to the present invention can also include "pulse healing." That is, for a first pulse and a second pulse, a combined pulse duration can be defined that extends from a start time of the first pulse to an end time of the second pulse. It is then determined whether the start time of the second pulse exceeds the end time of the first pulse by less than a predefined threshold, which can be based, for example, on the combined pulse duration. If the start time of the second pulse exceeds the end time of the first pulse by less than the predefined threshold, then the first pulse and the second pulse are combined into a single pulse (i.e., the single pulse is "healed").

Similarly, pulses can be "healed" in frequency. That is, for a first pulse and a second pulse, a combined pulse bandwidth can be defined that extends from a lower frequency of the first pulse to an upper frequency of the second pulse. It is then determined whether the lower frequency of the second pulse exceeds the upper frequency of the first pulse by less than a predefined threshold, which can be based, for example, on the combined pulse bandwidth. If the lower frequency of the second pulse exceeds the upper frequency of the first pulse by less than the predefined threshold, then the first pulse and the second pulse are combined into a single pulse.

Another method for processing RF signals according to the invention comprises receiving a set of time domain energy samples representing signal energy present in an RF spectrum. The set of time domain energy samples can be transformed into a set of frequency domain power samples. Transforming the set of time domain samples into a set of frequency domain samples can include dividing the set of time domain energy samples into a plurality of N windows, each of which is associated with a predefined window period. For each of the N windows, an FFT is performed to generate a set of K frequency bins. Each of the frequency bins has a value based on energy present in a predefined frequency band during the corresponding window period.

From the set of frequency domain power samples, it can be determined whether a signal of interest is present in the RF spectrum. A subset of the set of frequency domain power samples can be forwarded to a follow on system, where the subset corresponds to the signal of interest. To determine whether a signal of interest is present can include generating an energy map that represents energy present in the RF spectrum as a function of frequency and time. The energy map can be a bitmap comprising N×K frequency cells, wherein each frequency cell has a binary value based on the value of a corresponding frequency bin. The binary value can be based, for example, on whether the value of the corresponding frequency bin exceeds a predefined threshold.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific apparatus and methods disclosed.

DETAILED DESCRIPTION OF PREFERRED EMBODIMENTS

Definitions

Figure 1:
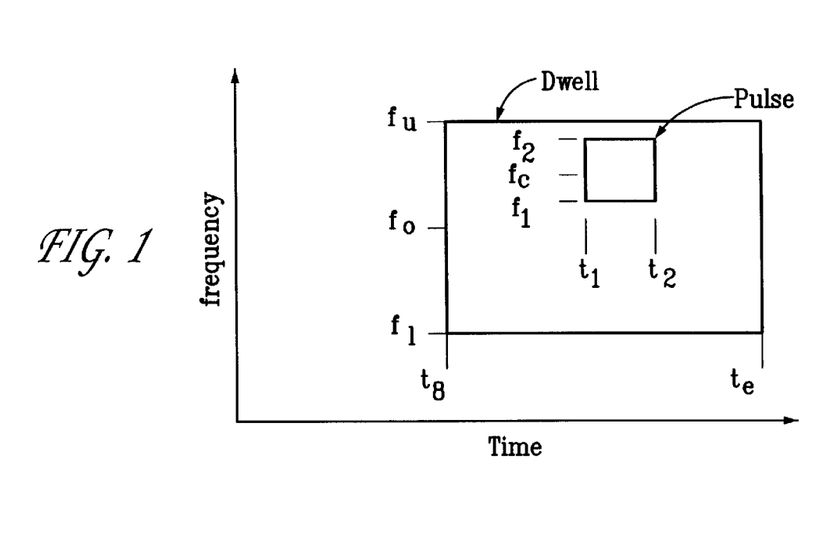
FIG. 1 is a plot of RF energy as a function of frequency and time.

FIG. 1 provides a general reference for definitions of certain terms that will be used throughout this disclosure. A "dwell" is a collection of radio frequency (RF) spectra within a lower frequency limit, $f_l$, and an upper frequency limit, $f_u$, with a center frequency $f_0$ halfway between $f_l$ and $f_u$, during period $t_s$ to $t_e$. An "emitter" is an RF source that contributes to the spectra. A "dwell data set" is a formatted data set representative of all the spectra contained in a dwell.

A dwell results from a receiver being tuned to $f_0$ and the RF energy being collected over a period between a dwell start time, $t_s$, and a dwell end time, $t_e$. For events within a dwell, time is relative, where the beginning of a spectrum observation period, i.e., the dwell, is zero time and $t_1$ and $t_2$ are some number of ticks on a counter that is initialized at the beginning of the spectrum observation period.

A "pulse" is an energy burst occurring within a dwell. Typically, many pulses occur within one dwell. A pulse is characterized by an upper and lower frequency bound, $f_2$ and $f_1$, respectively, and occurring between the start of the energy burst, $t_1$, and the end of the energy burst, $t_2$. A pulse has a center frequency of $f_c$ halfway between $f_1$ and $f_2$, and a "pulse duration" of $t_2 - t_1$. A "tag" is a characterization of a pulse and contains the value $t_1$, $t_2$, $f_1$, and $f_2$, which mark the pulse boundaries. A "tag generator" is a device that converts a pulse into a tag. A "frequency segment" consists of the frequencies spanned by a frequency bin (i.e., an FFT bin).

RF Energy Mapper

Figure 2:
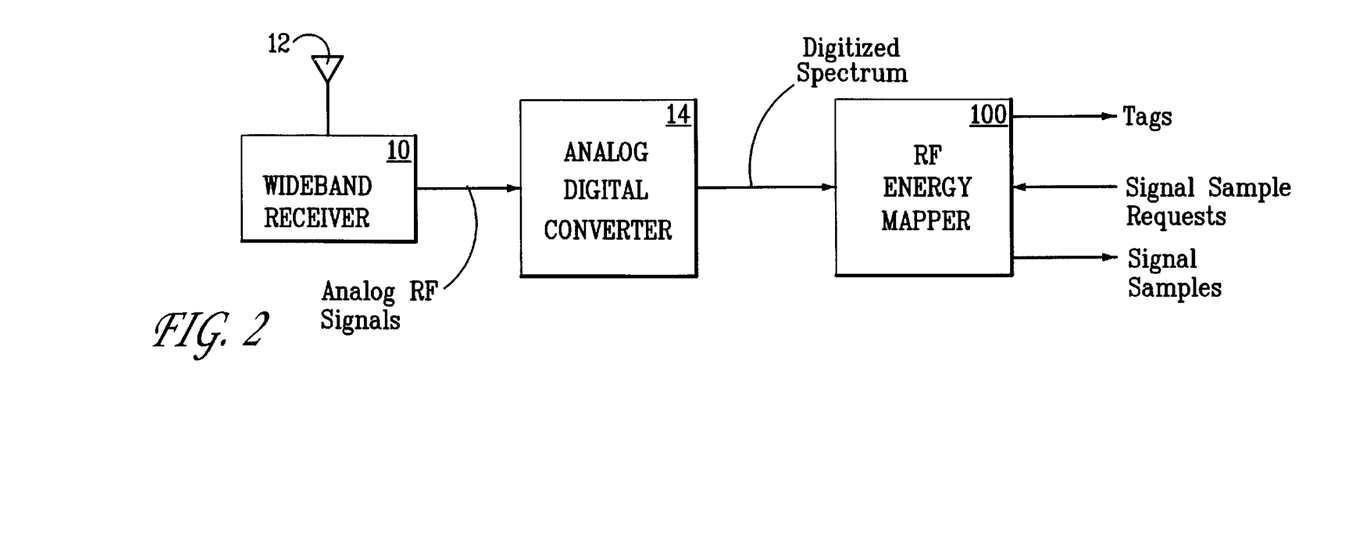
FIG. 2 is a block diagram of an RF energy collection and analysis system.

FIG. 2 is a block diagram of an RF energy collection and analysis system according to the present invention. A wideband receiver 10 receives analog RF signals via an antenna 12. Receiver 10 passes the analog signals through an analog-to-digital (A/D) converter 14, wherein the analog signals are converted to digital signal samples via well-known analog-to-digital conversion techniques. A/D converter 14 outputs a digitized spectrum in the time domain, that is, a stream of digital signal samples that represents the received signal energy as a function of time.

According to the present invention, the stream of time domain samples is input into an RF energy mapper 100. RF energy mapper 100, which is described in detail below, performs a spectral analysis on the input signal samples to detect the presence of signals of interest in the digitized spectrum. Energy tags are generated for the signals of interest and can be passed on to one or more follow-on systems for further analysis. Preferably, RF energy mapper 100 stores the signal samples and can forward the stored signal samples to a follow-on system on request.

Generally, RF energy mapper 100 provides apparatus and methods for detecting and capturing broadcast radar and communications signals that are present in a frequency spectrum having a spectrum bandwidth that is wide relative to the bandwidth of the signals. RF energy mapper 100 detects and captures both short and transient signals (e.g., frequency hoppers), as well as conventional continuous (i.e., CW) signals (e.g., air guidance signals) and continuous modulated signals (e.g., commercial broadcast).

The input into RF energy mapper 100 is a stream of digitally encoded signal samples sourced by a wideband receiver. The bandwidth of the wideband receiver typically encompasses many hundreds or thousands of simultaneously transmitted signals. The system outputs tags for those collected signals. The tags describe the start and stop time and the lower and upper frequency bound of all of the signals meeting preset criteria for tagging. Where a signal is continuous rather than transient, such signal will be noted in the output tag as having a time period longer than the criteria for transient signals. A second product of the system is a randomly accessible delay line that stores all FFT representations of the incoming spectrum so that the signal associated with the tags is also outputted. The follow-on system uses the tags to request the signal samples associated with the tag.

An advantage of the system is that any and all signals within the spectrum being intercepted by the wideband receiver can be captured and described for downstream (i.e., follow on) systems that will further process the signals. Thus, RF energy mapper 100 provides a very efficient method for providing the comparatively narrowband signals along with their descriptors (i.e., the so-called tags). Preferably, RF energy mapper 100 tags and stores both communications signals and radar signals.

Figure 3:
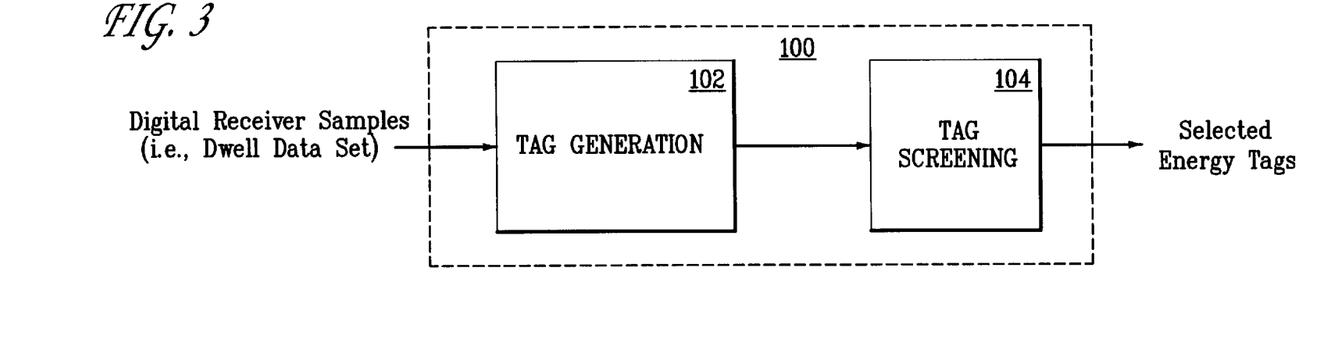
FIG. 3 is a block diagram of an RF energy mapper according to the present invention.
Figure 4:
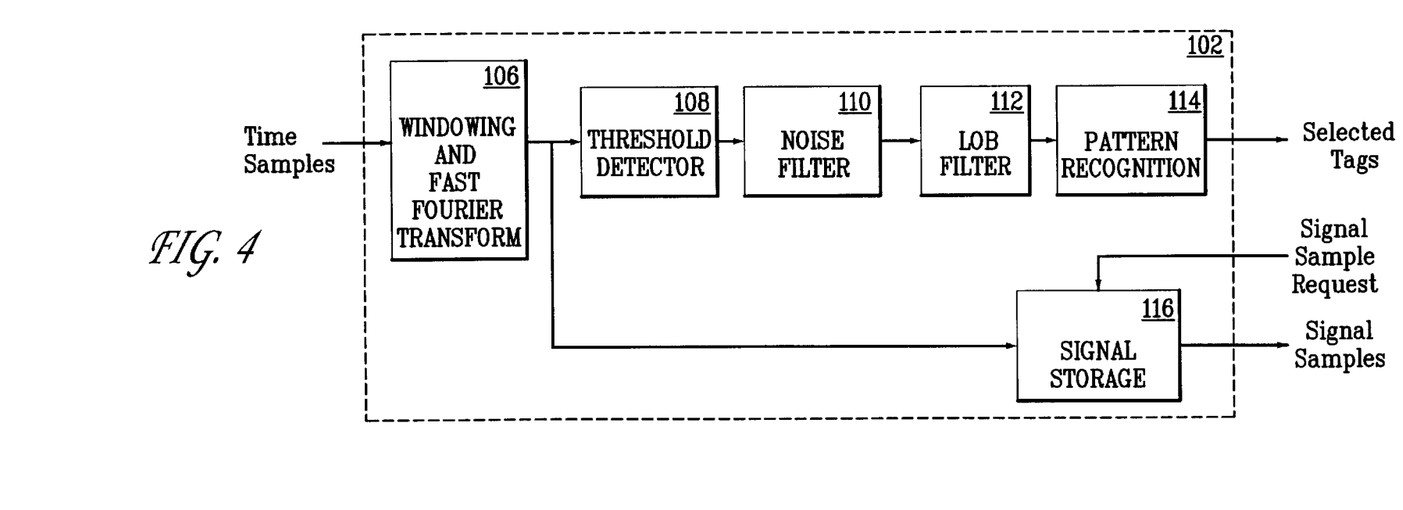
FIG. 4 is a block diagram of a tag generator according to the present invention.
Figure 6:
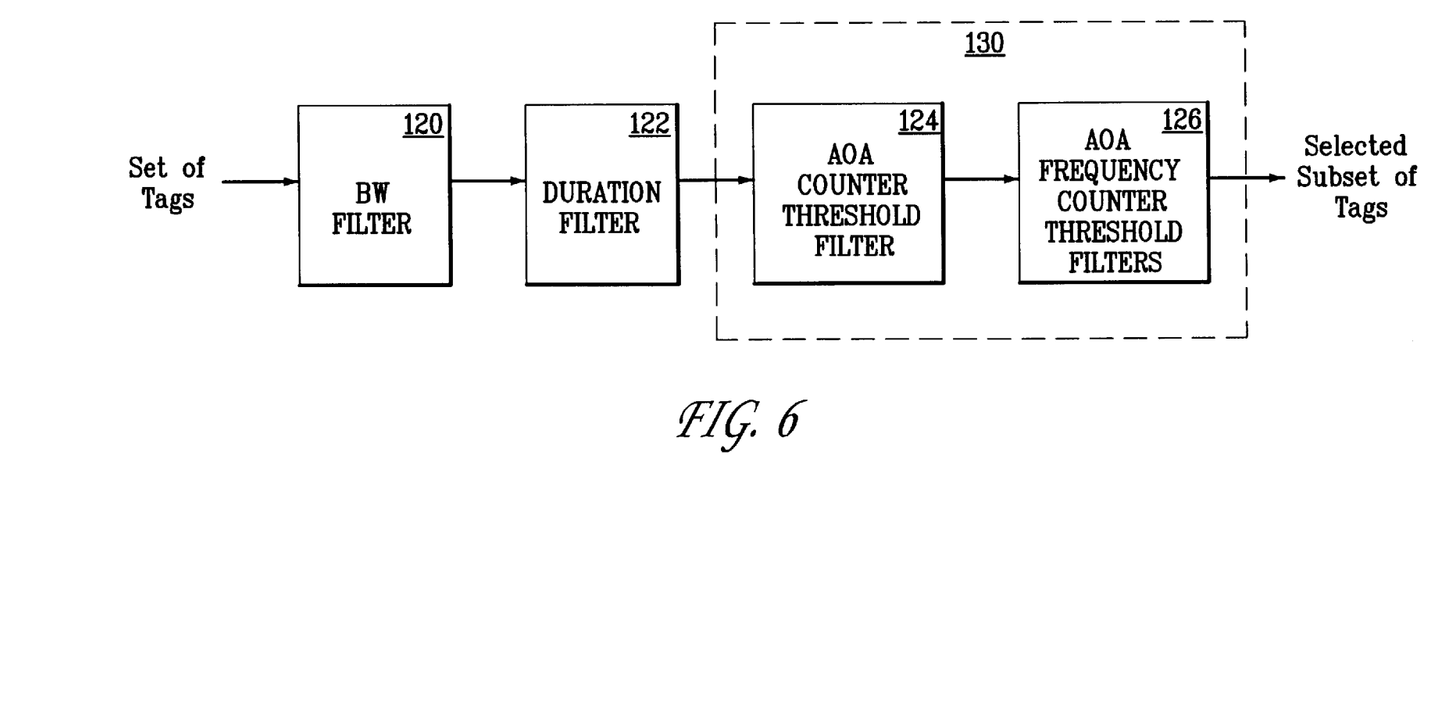
FIG. 6 is a block diagram of a tag screening process according to the present invention.

As shown in FIG. 3, RF energy mapper 100 receives digital receiver samples in the time domain from one or more digital receivers, and generates selected energy tags for a follow-on subsystem. Preferably, RF energy mapper 100 performs this function in a twostep process. First, a tag generation process 102 identifies those spectral energy segments in the RF search band that are above a minimum amplitude and are not noise related. Tag generation process 102 is illustrated in FIG. 4. Next, a tag screening process 104 is employed to limit the number of tags that are output to the follow-on system. Tag screening process 104 is illustrated in FIG. 6.

As shown in FIG. 4, a tag generator 102 according to the present can include an FFT and windowing function 106, a thresholding function 108, a pattern recognition and noise filter function 110, a line of bearing (LOB) filter 112, a signal of interest (SOI) energy definition function 114, and a signal storage function 116.

FFT and windowing function 106 serves to convert the time domain representation of the spectrum into its equivalent in the frequency domain. FFTs are performed on the signal samples at rates that accommodate the signal set intended to be captured. Thus, FFT/windowing function 106 is typically constructed to provide for variable frequency binning and variable FFT rates. For communication systems intercept, for example, narrow frequency bins can be used as part of the FFT, while for radar intercept, wide frequency bins with FFTs executed at a much more rapid rate is required. FFT bin size selection will determine the detectability of the signal, as well as the system's ability to measure the arrival and departure time of the signals to be intercepted.

The output of the FFTs, which is a set of frequency domain power samples, is stored in signal storage 116. Each of the frequency domain power samples has a value based on the RF energy that is present in the dwell bandwidth ($f_u - f_l$) during the corresponding FFT window. The frequency domain samples are stored until a decision is made as to whether a pulse of interest is present in the RF spectrum. As will be described in detail below, if a pulse is detected in the RF spectrum, the tags that correspond to that pulse are forwarded to a follow-on system for further processing. Since the frequency domain samples are stored in signal storage 116, the frequency domain samples can be forwarded to the follow on system on request. The follow on system can then perform an inverse FFT on the requested frequency domain samples, which will be, in general, a subset of the set of frequency domain samples stored in signal storage 116, to reconstitute the signal of interest in the time domain.

It is important to note that this approach (i.e., storing and forwarding frequency domain samples) is much more efficient than storing and forwarding the corresponding time domain samples. According to the invention, only those bins that are required to reconstitute a relatively narrow band signal detected in a relatively wide band spectrum need to be forwarded to the follow on system. At the same time, no information is lost because the set of frequency domain samples includes all the signal information that the time domain samples include.

Thus, as a practical consideration, storing the frequency domain samples in signal storage 116 (which is basically a delay line) provides for an efficiency of processing of the selected signals. A broadband receiver that captures all the signals within its bandwidth makes it more difficult to process the multiplicity of individual narrowband signals. Preferably, the receiver is matched to the bandwidth of the signal desired to be processed. In such an implementation, with the signals being stored as their frequency domain representation, the follow on systems need only process a very small part of the entire intercepted spectrum related to the (comparatively) narrow band. This can result in an order of magnitude decrease in the follow-on processing of the signal, the order of magnitude being determined by the ratio of the full spectrum to the signal bandwidth.

The output of the FFTs is also inputted to threshold detector 108, which basically converts the 3-dimensional output of the FFT function into a 2-dimensional representation. More specifically, the signal as presented at the output of the FFT function is a series of FFT bins. Thus, there is a first dimension, i.e., a representation of the spectrum in frequency. Second, the FFTs are performed periodically (i.e., once each FFT window period), thus there is a time dimension. Third, the value the FFT assigns to each frequency bin is a power level that represents the signal energy in that frequency bin during that window period. Thus, the third dimension is signal power.

For each frequency cell for each FFT window period, a binary decision is made to indicate the presence or absence of energy relative to a noise floor computation that, preferably, is continually adjusted for the RF intercept environment. The frequency-time-power vectors that are inputted to thresholding function 108 is reduced to a frequency-time grid, whose entries have a binary value (i.e., either a 1 or a 0) that depends on the power within each cell. The thresholding is a decision that can be made using varying degrees of complexity. The simplest form is a fixed level entered into the thresholder and any bin having a power level that exceeds the threshold results in the power level being converted to a one; wherever it is below the threshold, the power level is replaced by a zero. Thus, the output of threshold detector 108 is a grid in frequency and time that depicts significant power exceedances in each of the bins.

Figure 5:
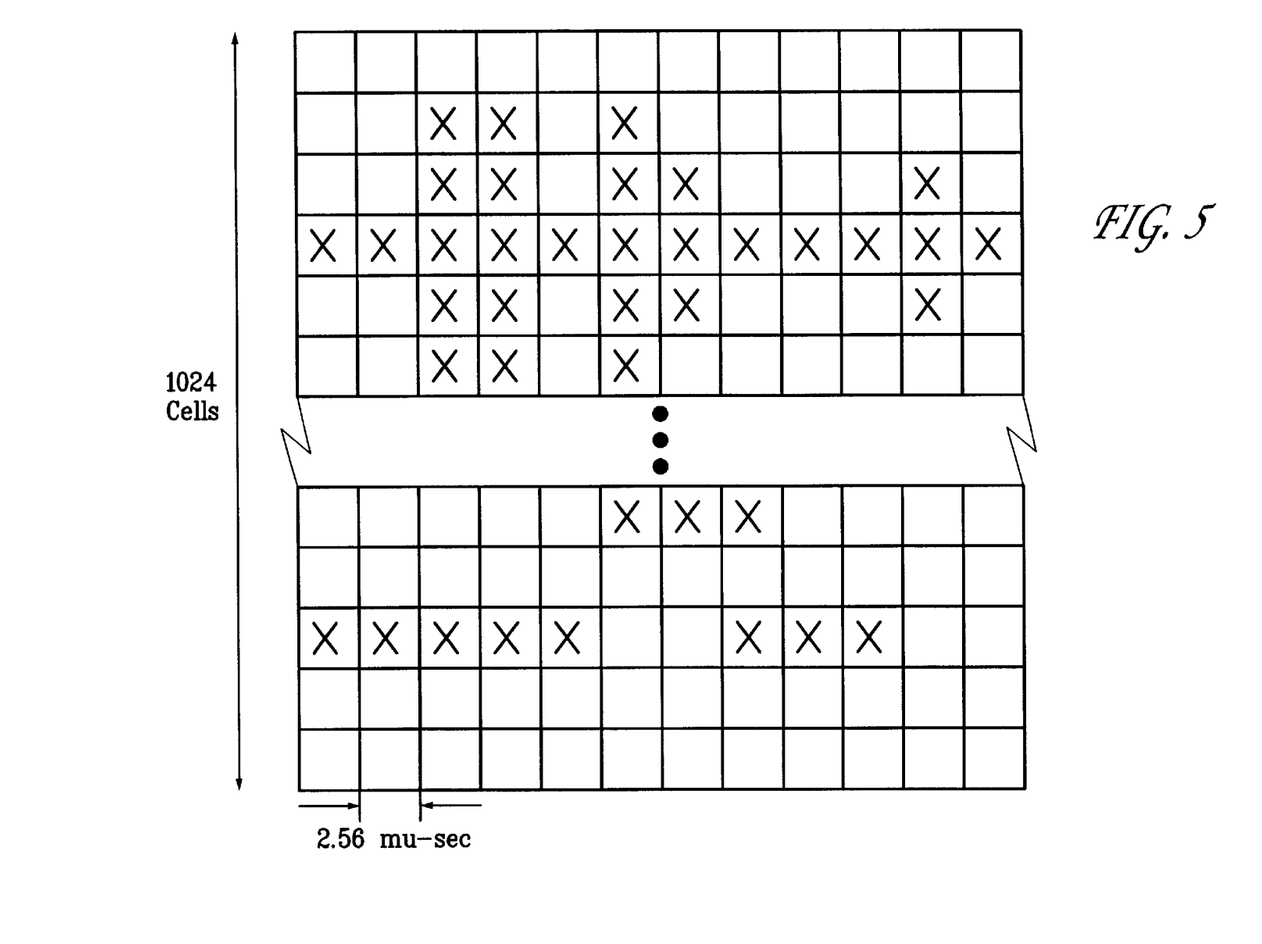
FIG. 5 is an RF energy bitmap according to the present invention.

An exemplary frequency-time grid is shown in FIG. 5 (where Xs are used to represent bins having a value of one, and blanks are used to represent bins having a value of zero). As shown in FIG. 5, a preferred frequency-time grid includes 1024 frequency cells for each 2.56 microsecond window period. It should be understood that the number of frequency cells (i.e., FFT bins) can be selected based on the requirements of the specific application. For example, some radar signals are known to have pulse widths as low as 50 nanoseconds with a duty cycle on the order of 1%, while other radar signals can have pulse widths up to 1.5 microseconds at nearly 50% duty cycle. The proliferation of radar signals is typically in the 2–18 GHz band, but can occur in the range of 500 MHz to 40 GHz. Communications signals, on the other hand, can be much more narrow band than radar signals, and typically have nearly 100% duty cycle. It is known, however, that for signal systems such as frequency hoppers, the 100% duty cycle is relative to a hop frequency.

Most communications signals are under 2 GHz, but can extend above 2 GHz in microwave and millimeter wave communications.

One advantage of the present invention is that the RF energy mapper provides apparatus and methods for detecting the presence of radar signals as well as communications signals in the same dwell data set. A system according to the present invention can utilize the RF energy mapper for both radar and communications intercept, although, in a preferred embodiment, it does not perform them simultaneously, but rather sequentially.

Threshold detector 108 can also be built to include more complex criteria for inclusion of a 1 or a 0 in each cell. That criteria analyzes the degree to which the power exceeds the threshold and for the duration that the power is there. Thus, short signals that barely make thresholds are more likely to be noise than signal, while strong signals of short duration are more likely to be signals than noise. Signals of low power with extended duration are also more likely to be signals than noise. Thus, a set of rules are formulated and implemented in a combination of hardware, firmware and software to execute this more elaborate threshold making function.

At this point, there is an N-to-1 data reduction in the amount of data passing through the system, where N is determined by the dynamic range of the digital samples representing the spectrum. For example, an 8-bit code would result in an 8-bit bin size, while a 16-bit code would result in a 16-bit bin size. In the first example, there would be an 8-to-1 data reduction, while in the second example there would be a 16-to-1 data reduction. The data reduction is a function of the requirements of the system that includes the RF Energy Mapper as a subsystem.

The frequency-time grid output from threshold detector 108 is then submitted to a noise filter 110, wherein the grid is processed to eliminate noise. Noise, as that term is used herein, means anything other than a pattern indicative of a signal of interest (SOI), and that will be most of the energy in the frequency-time grid. Thus, a system according to the present invention is very much a noise processor. The noise filter is used principally to separate pulsed from continuous signals and to eliminate obvious noise patterns. "Continuous" includes modulated continuous waveform (CW) which, on a map, will appear as a continuous ragged signal relative to the frequency cells occupied. Lightning strokes, ignition noise, and other spiking, broadband noise produces clear patterns that can be deleted.

Once the noise is eliminated from the signals in the frequency-time bit map, the bit map is passed to a line of bearing (LOB) filter 112. Line of bearing is also commonly referred to as "angle of arrival" or "azimuth." The next level of processing uses angle of arrival to pass only those signals that are radiating from a sector or sectors that could contain signals of interest. The angle of arrival data reduction in a uniformly distributed environment will be the ratio of the sector size to 360 degrees.

Those spectral energy segments that have not been eliminated as noise are then subjected to pattern recognition and SOI energy definition process 114 to formally define the energy time and frequency extent. Process 114 follows a set of rules (which can be implemented in hardware, firmware, or software) for drawing rectangles in time and frequency around the patterns in the frequency-time grid. The length and width of those rectangles are measured in frequency and time, with specific starting and stopping positions, such as a lower frequency extent, $f_L$, an upper frequency extent, $f_U$, a start time of the rectangle, $t_1$, and an end time of the rectangle, $t_2$. The rules are set to encompass the whole frequency-time pattern of a given transient pulse when characterizing transient pulses. Thus, maximum variations in frequency determine the frequency extents and maximum extents in time determine the time extents. Any signal having a duration $(t_2-t_1)$ that exceeds a preset time duration, $T_{max}$, is considered to be a continuous signal.

Process 114 also includes rejecting corrupted pulses and collecting fractured pulses in order to define a rectangular area to completely encompass each valid pulse. Energy may appear disassociated in a frequency-time grid when, in fact, the energy should be treated as a unified transmission. For example, in communications, voice signals have numerous breaks. Discrete frequency shifts and data communications will result in disconnections within the bit map when, in fact, it is a single, unified transmission.

Breaks in a pulse, if less than a preset percentage, can be ignored. In a preferred embodiment, this so-called "signal drop time percentage" is set at ⅓ of $t_2$ minus $t_1$. It should be noted that this percentage is not critical to the pattern recognition function. It is merely a judgmental factor that can be considered a design variable. This sub-function within pattern recognition function 110, which is sometimes referred to as "pulse healing," can be implemented in hardware, firmware or software.

Then, as a function of the SOI, rules are applied for examination of not only each region where there is energy evident, but also in the surrounding region and an estimate is made of the frequency and time extents and a rectangle in frequency and time is drawn around energy containing regions. A tag is generated for each rectangle defining its bandwidth, center frequency, duration, and time of arrival. These tags are then subjected to a tag screening process as shown in FIG. 6. This screening begins by subjecting the tags to a bandwidth filter 120 and a duration filter 122. Signals that are too short or too long to fit the SOI characteristic will be filtered out. Signals with bandwidths not matching the SOI will also be filtered out. At this point, a refined examination of the RF energy map has been made.

For high rate signals, histogramming limiters 130, which are described in greater detail below, can be used to limit pulses entering the narrowband processing section, which can be as high as 300,000/pps for a pulse doppler emitter. The azimuth and frequency histogrammers 124, 126 serve to limit the maximum number of pulses accepted from a single emitter. In the case of a pulse doppler where a 100 ms dwell is employed during the intercept, as many as 30,000 pulses could be submitted to the system, it is unnecessary and undesirable to collect and process all of these pulses. The azimuth and frequency histogrammers will limit pulses to a programmable maximum, usually 128 pulses in any azimuth frequency range (nominally 1.25 MHz by 3 degrees). Typically, 128 pulses will be more than sufficient to characterize an emitter and track it accurately. In the example provided, a 300:1 reduction with no loss of performance is realized. For pulse rates under 1 kilopulse/sec with system setup described, no pulses would be lost due to thresholding.

Histogramming Limiters

A histogramming limiter according to the present invention is a system that uses histograms to limit data flow through a signal processing system so that the system is not overloaded. In a preferred embodiment, the histogramming limiter selectively limits data flow based on density of signal frequency and signal duration.

As described above in connection with FIG. 2, data flows through the system in dwell data sets. Typically, the dwell data set has redundant information in the case of high rate emitters when the purpose of the system is to detect and locate an emitter. To reduce data flow, a histogramming limiter allows only essential data to pass through the system while blocking redundant data.

Figure 7:
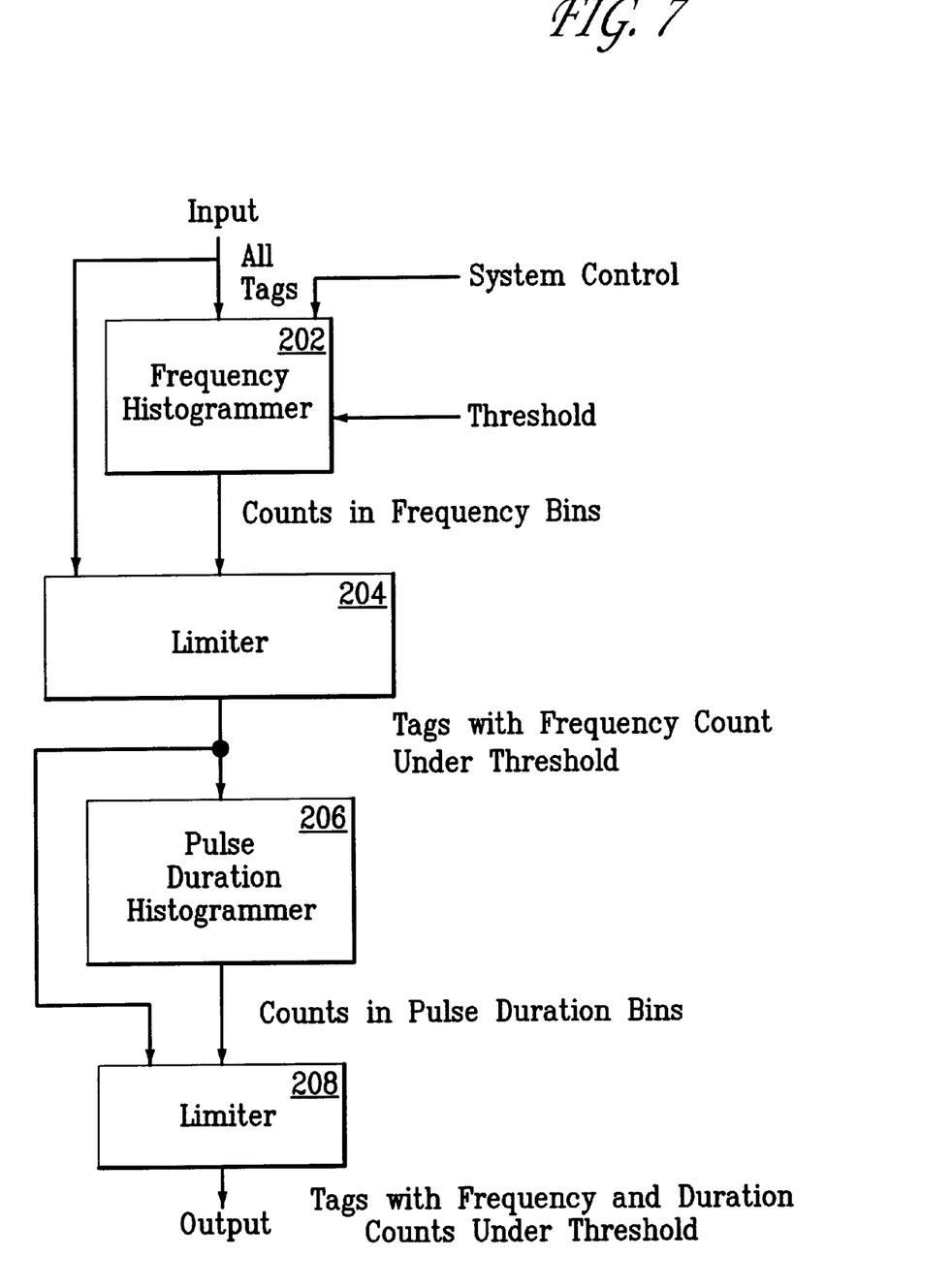
FIG. 7 is a block diagram of a histogramming limiter according to the present invention.

FIG. 7 provides a flowchart of a histogramming limiter according to the present invention. A set of tags is produced, for example, by a tag generator such as described above. Each tag represents a pulse defined by a start time, end time, upper frequency, and lower frequency. From these values, pulse center frequency and pulse duration can be determined. The set of tags is provided as input to the histogramming limiter.

At step 202, a frequency histogrammer generates a frequency histogram that represents the number of pulses that fall into each of a plurality of frequency bins. The frequency histogram is generated based on the center frequencies that are included in the tags. At step 204, a frequency limiter determines, for each frequency bin, whether the number of pulses that fall into that bin exceed a predefined threshold. If so, only the threshold number of tags is passed on further into the signal processing system. Thus, the frequency histogrammer limits the number of tags that are allowed through the system based on frequency.

At step 206, a pulse duration histogrammer generates a pulse duration histogram that represents the number of pulses that fall into each of a plurality of pulse duration bins. The pulse duration histogram is generated based on the pulse durations that are included in the tags. At step 208, a pulse duration limiter determines, for each pulse duration bin, whether the number of pulses that fall into that bin exceed a predefined threshold. If so, only the threshold number of tags is passed on further into the signal processing system. Thus, the pulse duration histogrammer limits the number of tags that are allowed through the system based on pulse duration.

Figure 8:
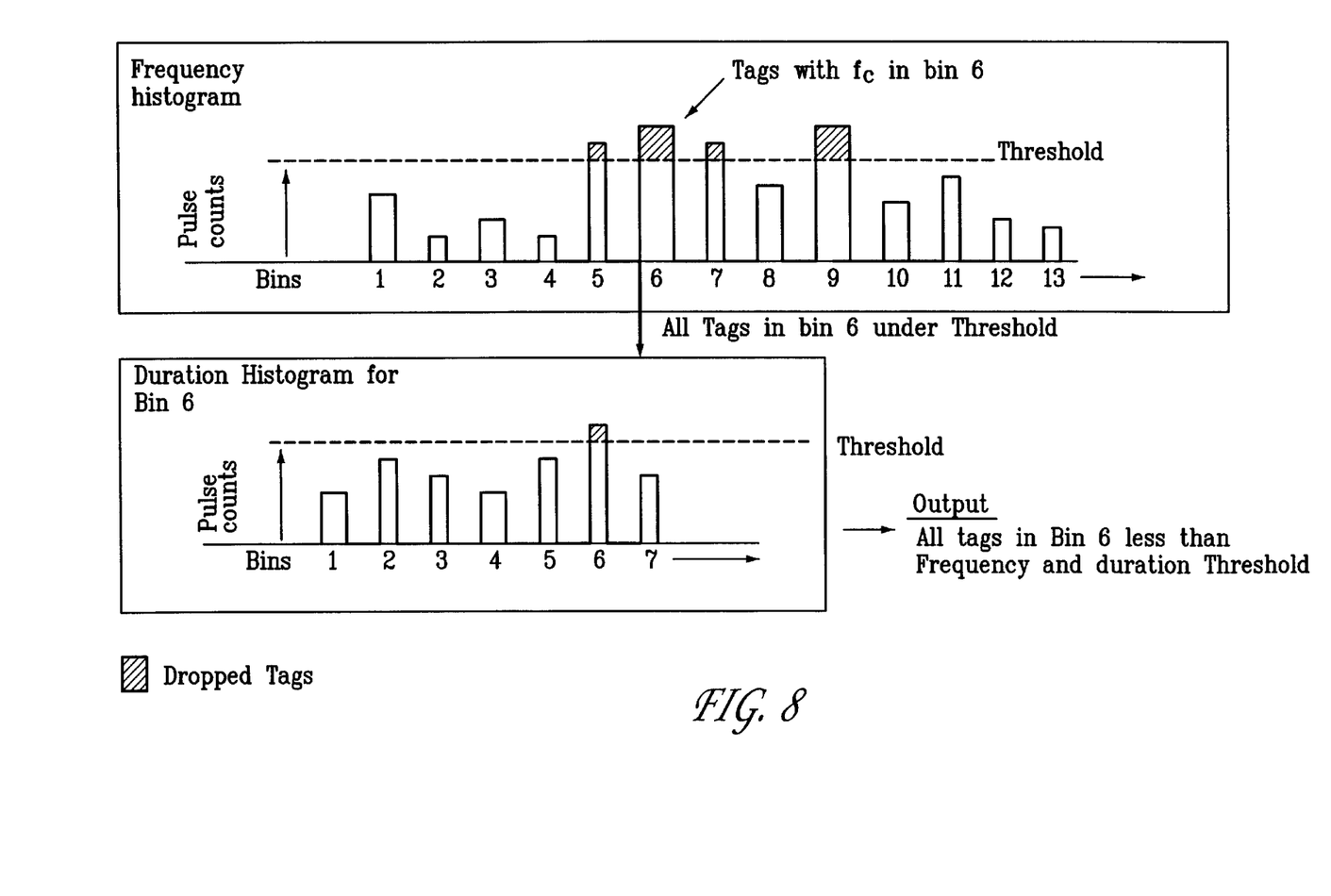
FIG. 8 provides a frequency histogram with a pulse duration histogram for one frequency bin.

FIG. 8 provides a frequency histogram example with a pulse duration histogram for one frequency bin.

Figure 9:
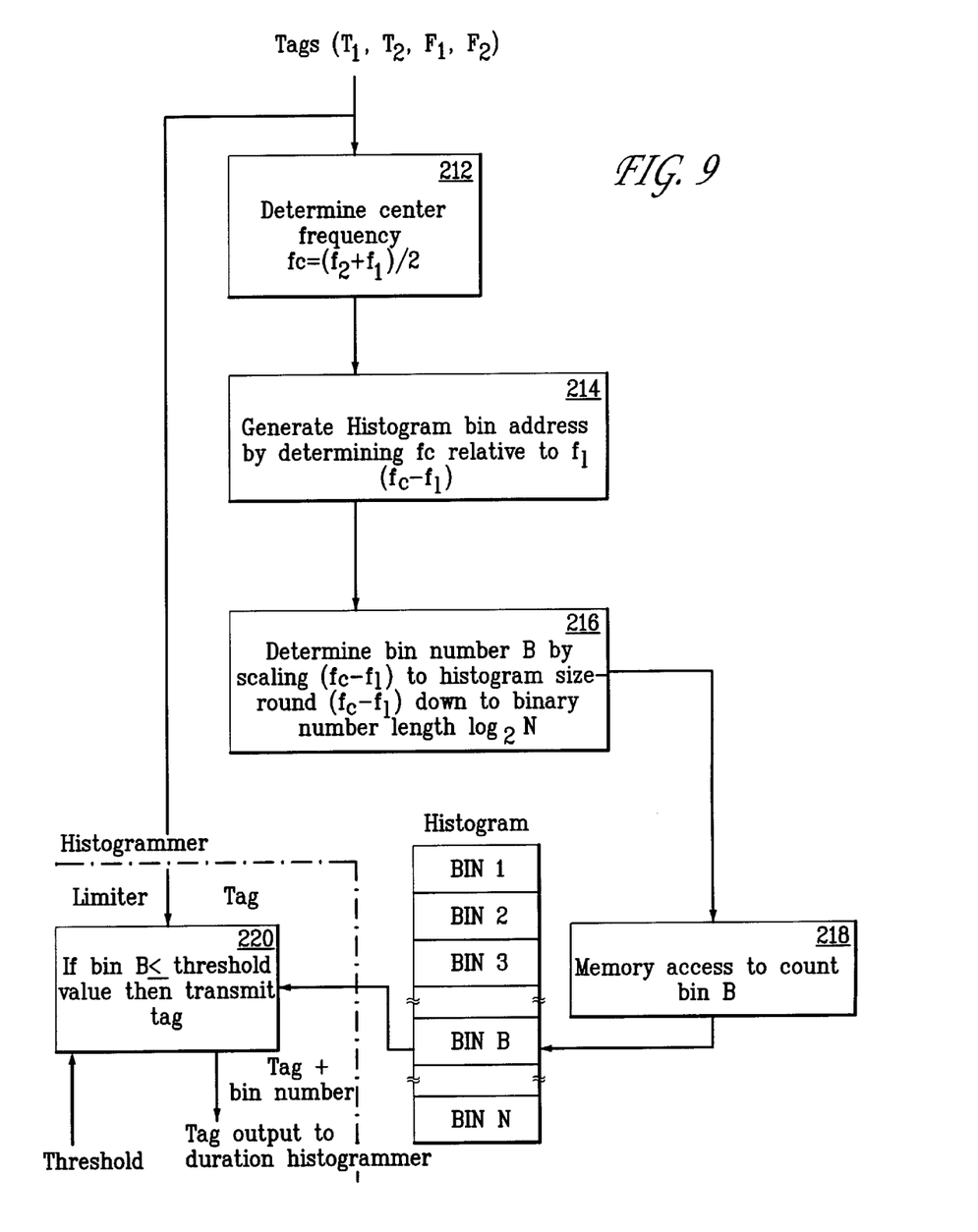
FIG. 9 provides a flowchart for a frequency histogramming limiter according to the present invention.

FIG. 9 provides a detailed description of a frequency histogrammer according to the present invention. As described above, the frequency histogrammer receives as input all the tags for a given dwell. In a preferred embodiment, the histogram is empty at the start of each dwell because the histogram counts pulses within each dwell period. At step 212, the center frequency, $f_c$, of each tag is computed by taking an average of the sum of $f_1$ and $f_2$, the lower and upper frequencies of the tags. At step 214, a histogram bin address is determined for each pulse. The frequency bin within which the pulse falls is determined by $f_c$ and its relation to $f_1$, the lower frequency limit of the dwell. Thus, each frequency bin covers a range of frequencies.

Preferably, the pulse center frequency, $f_c$, is rounded to the numeric precision of bin size at step 216. For rapid computation and ease of construction, binary integer bin sizes can be used. At step 218, the resulting binary integer is used as a relative address into the histogram, which, in a preferred embodiment, is a set of counters in memory. The content of a counter is advanced by one each time a pulse falls within its range. When a counter is advanced, the count is compared to a threshold value, at step 220, and if the count exceeds the threshold, the limiter stops the tag from proceeding further through the system. Otherwise, the tag is passed through the system. The threshold is a value typically established when the system is initialized.

Figure 10:
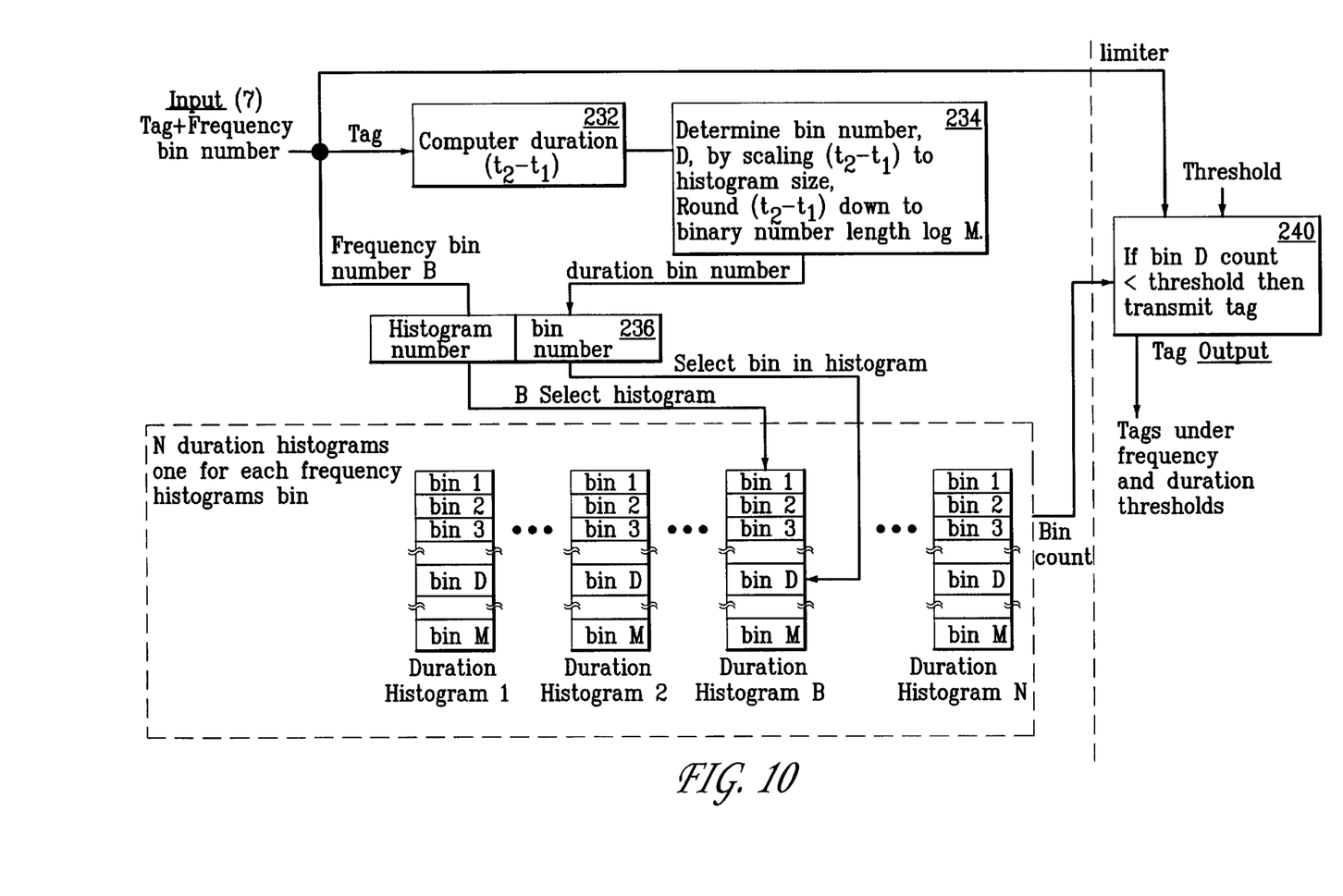
FIG. 10 provides a flowchart for a duration histogramming limiter according to the present invention.

A similar process occurs for the pulse duration histogramming limiter, as shown in FIG. 10. The input to this part of the histogrammer limiter is the subset of tags output from the frequency histogrammer limiter, and comprises the tag and the frequency bin number associated with each tag. The first operation is the computation of the pulse duration, $t_2-t_1$, at step 232. The bin associated with the duration is determined, at step 234, by rounding to a binary integer of length $\log_2(M)$, where M is the total number of duration bins. Preferably, the pulse duration histogrammer limiter uses a set of histograms, one histogram for each frequency bin. At step 234, the frequency bin number in the input then is used to select the corresponding duration histogram and, at step 236, the pulse duration counter corresponding to the pulse duration bin is advanced within the selected histogram. The bin count in the selected bin is then output at step 238. The output bin count is compared to a threshold at step 240 and, if the count does not exceed threshold, the tag is outputted for additional system processing. Otherwise, the tag is suppressed. Again, this threshold is normally set at system initialization.

Thus there have been described systems and methods for detecting signals across radar and communications bands. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

We claim:

1. A method for processing RF signals comprising:
    generating an energy map of collected radio frequency (RF) energy as a function of time and frequency for a predefined dwell period and dwell bandwidth by dividing the dwell period into a set of k time windows, dividing the dwell bandwidth into a set of n frequency bins, and generating an energy grid comprising n×k frequency-time cells, wherein each frequency-time cell corresponds to one of the frequency bins and to one of the time windows and has a value based on the collected RF energy present in the corresponding frequency bin during the corresponding time window;
    determining from the energy map whether a pulse is present in an RF spectrum defined by the dwell period and the dwell bandwidth; and
    if a pulse is present in the RF spectrum, determining from the energy map a pulse bandwidth and pulse duration of the pulse.

2. The method of claim 1, wherein generating the energy map comprises:
    assigning a binary value to each of the frequency-time cells based on whether the collected RF energy present in the corresponding frequency bin during the corresponding time window exceeds a predefined energy presence threshold.

3. The method of claim 1, wherein the collected RF energy includes energy from a communications signal and energy from a radar signal.

4. The method of claim 1, wherein the collected RF energy includes energy from a transient signal and energy from a continuous signal.

5. The method of claim 1, further comprising:
    determining from the energy map whether noise is present in the RF spectrum; and
    if noise is present in the RF spectrum, filtering the noise from the energy map.

6. The method of claim 1, further comprising:
    if a pulse is present in the RF spectrum, generating a tag that is associated with the pulse and includes a pulse characterization parameter that characterizes the pulse.

7. The method of claim 6, wherein the pulse characterization parameter is based on pulse width, center frequency, angle of arrival, or time of arrival.

8. The method of claim 1, further comprising:
determining, for a first pulse and a second pulse, a combined pulse duration that extends from a start time of the first pulse to an end time of the second pulse;
determining whether the start time of the second pulse exceeds the end time of the first pulse by less than a predefined threshold; and
if the start time of the second pulse exceeds the end time of the first pulse by more than the predefined threshold, combining the first pulse and the second pulse to define a combined pulse.

9. The method of claim 8, wherein the predefined threshold is based on the combined pulse duration.

10. The method of claim 1, further comprising:
determining, for a first pulse and a second pulse, a combined pulse bandwidth that extends from a lower frequency of the first pulse to an upper frequency of the second pulse;
determining whether the lower frequency of the second pulse exceeds the upper frequency the first pulse by less than a predefined threshold; and
if the lower frequency of the second pulse exceeds the upper frequency of the first pulse by more than the predefined threshold, combining the first pulse and the second pulse to define a combined pulse.

11. The method of claim 10, wherein the predefined threshold is based on the combined pulse bandwidth.

12. A method for processing RF signals comprising:
generating an energy map of collected radio frequency (RF) energy as a function of time and frequency for a predefined dwell period and dwell bandwidth;
determining from the energy map whether a pulse is present in an RF spectrum defined by the dwell period and the dwell bandwidth;
if a pulse is present in the RF spectrum, determining from the energy map a pulse bandwidth and pulse duration of the pulse;
determining, for a first pulse and a second pulse, a combined pulse bandwidth that extends from a lower frequency of the first pulse to an upper frequency of the second pulse;
determining whether the lower frequency of the second pulse exceeds the upper frequency of the first pulse by less than a predefined frequency healing threshold; and
if the lower frequency of the second pulse exceeds the upper frequency of the first pulse by less than the frequency healing threshold, combining the first pulse and the second pulse to define a combined pulse.

13. The method of claim 12, wherein generating the energy map comprises:
dividing the dwell period into a set of k time windows;
dividing the dwell bandwidth into a set of n frequency bins;
generating an energy grid comprising n×k frequency-time cells, wherein each frequency-time cell corresponds to one of the frequency bins and to one of the time windows and has a value based on the collected RF energy present in the corresponding frequency bin during the corresponding time window.

14. The method of claim 13, wherein generating the energy map comprises:
assigning a binary value to each of the frequency-time cells based on whether the collected RF energy present in the corresponding frequency bin during the corresponding time window exceeds a predefined energy presence threshold.

15. The method of claim 12, wherein the frequency healing threshold is based on the combined pulse bandwidth.

16. The method of claim 13, wherein the frequency healing threshold is based on the combined pulse bandwidth.

17. The method of claim 14, wherein the frequency healing threshold is based on the combined pulse bandwidth.

18. The method of claim 12, further comprising:
generating a tag that is associated with the combined pulse and includes a pulse characterization parameter that characterizes the combined pulse.

19. The method of claim 18, wherein the pulse characterization parameter is based on pulse width, center frequency, angle or arrival, or time of arrival.

20. The method of claim 12, further comprising:
determining, for a first pulse and a second pulse, a combined pulse duration that extends from a start time of the first pulse to an end time of the second pulse;
determining whether the start time of the second pulse exceeds the end time of the first pulse by less than a duration healing threshold; and
if the start time of the second pulse exceeds the end time of the first pulse by more than the duration healing threshold, combining the first pulse and the second pulse to define a combined pulse.

21. The method of claim 20, wherein the duration healing threshold is based on the combined pulse duration.

* * * * *